UNITED STATES PATENT OFFICE.

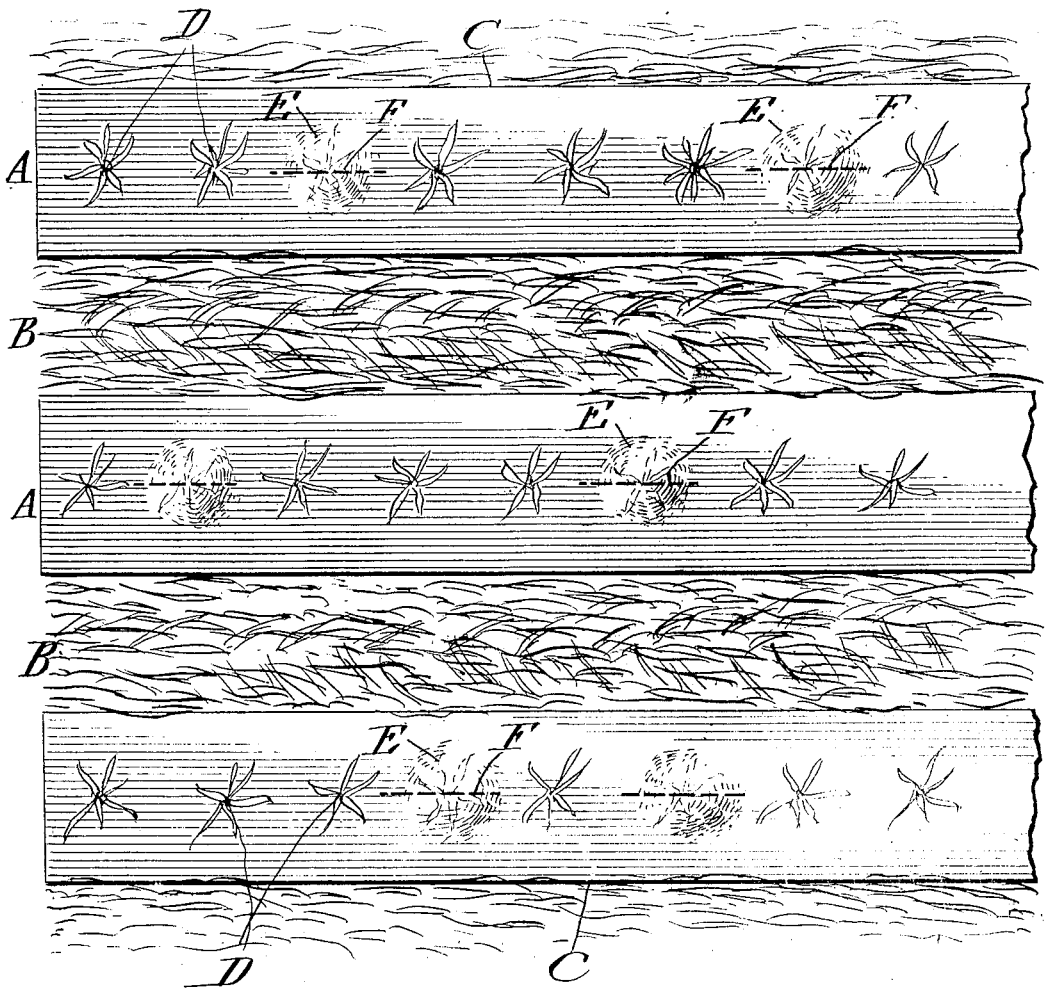

CHARLES FRANKLIN ECKART, OF OLAA, TERRITORY OF HAWAII.

PROCESS FOR ENHANCING THE GROWTH OF SUGAR-CANE.

1,287,267.  Specification of Letters Patent.  Patented Dec. 10, 1918.

Application filed June 25, 1917.  Serial No. 176,832.

*To all whom it may concern:*

Be it known that I, CHARLES F. ECKART, a citizen of the United States, residing at Olaa, Hawaii, Territory of Hawaii, have invented certain new and useful Improvements in Processes for Enhancing the Growth of Sugar-Cane; and I do hereby declare the following to be a full, clear, and exact description of the invention, such as will enable others skilled in the art to which it appertains to make and use the same.

This invention relates to a process for enhancing the growth of sugar-cane and is in the nature of an improvement on the process described and claimed in my Patent No. 1227898, dated May 29, 1917.

As explained in the above referred to patent, after the sugar-cane has been harvested, the roots and the portions of the stalks which remain in the ground comprise what is known in the art as the stubble. If this stubble remains in the rows, the following crop springs therefrom. While it is sometimes desirable to plow up the old stubble and plant the cane afresh, the stubble is permitted to remain in the ground ordinarily for a period of years. During this time, voluntary crops periodically sprout from the stubble, which crops are termed "ratoons" or "ratoon cane." Thus, in Hawaii, where the stubble is plowed from the field once in about every eight years and where the crop matures in two years, usually about three "ratoon crops" are grown. In Cuba, however, the stubble is plowed from the field only once in about ten or twelve years, and as the crop matures in practically one year, it will be readily seen that the majority of the cane produced are "ratoons." The shoots which spring from the stubble are at first spear-like in form and are exceedingly rigid. These shoots grow to some little height before the leaves begin to unfurl or expand so that during their initial growth, they are, as above mentioned, spear-like and rigid and are practically free of protuberances.

I have found in actual practice that where the covering, which is laid over the rows of stubble, lies in surface contact with the ground throughout its entire length, the young cane shoots in their growth pass through the covering and continue their growth in the manner described and claimed in the above referred to patent. However, where the rows are irregular and contain elevations and depressions, the covering will not lie in contact with the ground at all points, but will be elevated at certain points. For instance, if the row over which the covering is placed contains rocks, the covering will be elevated and the portion of the same adjacent to the rock or rocks will be spaced from the ground. The cane which grows beneath the portions of the covering which are spaced from the ground oft-times expand before they contact with the covering, to such an extent that they are unable to puncture and pass through the covering.

It is, therefore, the primary object of this invention to provide a method which will insure not only the enhancing of the growth of those shoots which pass through the covering of their own initiative, but also the enhancing of the growth of those shoots which grow beneath the elevated portions of the covering and expand in the manner above set forth.

In the drawing, the figure discloses, diagrammatically, the manner in which the process is carried out.

The process consists, as in the patent above referred to, in "palepaleing" or raking the cane refuse from the previous harvested crop, from the rows of stubble into the intervening spaces between the rows, so that the stubble is rendered free of any trash, and in further applying a dressing of fertilizer over the rows of stubble, and then placing the strips of paper or fabric longitudinally of the rows to form coverings which are superimposed on the stubble or the overlying soil. This paper or fabric, as in the case of the patent, may be either waterproof or non-waterproof, as the occasion requires, and the covering, which is of any desired length, may be either pegged or pinned to the ground, or may be held in place by the refuse which is located between the rows. While the fertilizer may be applied as above described, it is not at all essential to the carrying out of the process that it be used, for, under certain conditions, the process may be successfully carried out without the application of fertilizer.

After the young shoots have been permitted to grow for a period of about one month, after the laying of the covering material, during which time some of the shoots, that is to say, those shoots which arise from the ground where the covering is in contact with the ground, will have passed up through the covering, the covering is slitted, so as to permit the remaining shoots, which have failed to penetrate the covering, to pass therethrough. The points of slitting are determined by the "tent-like" formations in the covering which are produced by the pressure exerted by the cane shoots beneath the covering. By slitting the covering at these points, which slitting is carried out longitudinally of the covering, preferably, the blank spaces, which would otherwise occur in the cane rows, are avoided, and all of the shoots are permitted to pass through the covering, irrespective of whether or not the shoots are located beneath those portions of the covering which are in contact with the ground, or those portions which are elevated from the ground.

By allowing an interval of about one month between the applying of the coverings and the time of the slitting operation to elapse, it has been found in actual practice that the weed seeds no longer germinate in the cane rows, and the expanded cane shoots, therefore, pass through the slits in the coverings unaccompanied by weeds. The fact that the weeds are not able to take advantage of the slits is evidently due to the fact that the germination of the weed seeds is forced, due to the elevated soil temperature which attends the application of the coverings and to the favorable moisture conditions. As the young cane shoots are much hardier than the weeds, they are able to survive these conditions for a considerable length of time and to penetrate the coverings when the slits are made.

In the drawing, the cane rows are indicated by the reference character A, and the spaces between the rows by the reference character B. It is in these spaces that the refuse from the previously harvested crop is deposited. Those canes which have successfully passed through the coverings, which latter are indicated by the reference character C, are disclosed at D. The "tent-like" formations which have been above referred to are indicated by the character E, and the positions of the slits which have, however, not yet been made, are indicated by dot and dash lines at F. After these slits are made, the cane beneath the same which causes the "tent-like" formations will start and maintain the same vigorous growth as is attained by those shoots which, of their volition, pass through the coverings.

What I claim is:—

1. A process for enhancing the growth of sugar cane, which consists in superimposing a cover on the row of cane, which cover is pervious to unexpanded cane shoots and impervious to weeds, and forming openings in the cover at those points only beneath which expanded cane shoots are located.

2. A process for enhancing the growth of sugar cane, which consists in superimposing a cover on the row of cane, which cover is pervious to unexpanded cane shoots and impervious to weeds, and slitting the cover at those points only beneath which expanded cane shoots are located.

In testimony whereof I affix my signature.

CHARLES FRANKLIN ECKART.